(12) United States Patent
Elbacher et al.

(10) Patent No.: US 11,767,892 B2
(45) Date of Patent: Sep. 26, 2023

(54) CLAMPING BODY FREEWHEELING UNIT AND DRIVE DEVICE FOR AN ELECTRIC BICYCLE HAVING A CLAMPING BODY FREEWHEEL UNIT

(71) Applicant: GMN PAUL MULLER INDUSTRIE GMBH & CO. KG, Nuremburg (DE)

(72) Inventors: Manfred Elbacher, Nuremberg (DE); Andreas Radke, Nuremburg (DE); Christfried Weigel, Nuremburg (DE); Ulrich Noack, Nuremburg (DE)

(73) Assignee: GMN PAUL MULLER INDUSTRIE GMBH & CO. KG, Nuremburg (DE)

( * ) Notice: Subject to any disclaimer, the term of this patent is extended or adjusted under 35 U.S.C. 154(b) by 0 days.

(21) Appl. No.: 17/781,996

(22) PCT Filed: Dec. 2, 2020

(86) PCT No.: PCT/DE2020/101019
§ 371 (c)(1),
(2) Date: Jun. 2, 2022

(87) PCT Pub. No.: WO2021/110214
PCT Pub. Date: Jun. 10, 2021

(65) Prior Publication Data
US 2023/0003265 A1    Jan. 5, 2023

(30) Foreign Application Priority Data

Dec. 3, 2019  (DE) ............... 10 2019 218 785.4

(51) Int. Cl.
*F16D 41/28*  (2006.01)
*B62M 6/40*   (2010.01)
*F16D 41/07*  (2006.01)

(52) U.S. Cl.
CPC ............. *F16D 41/28* (2013.01); *B62M 6/40* (2013.01); *F16D 41/076* (2013.01)

(58) Field of Classification Search
CPC .............. F16D 41/28; F16D 41/076; F16D 2041/0606; B62M 6/40
See application file for complete search history.

(56) References Cited

U.S. PATENT DOCUMENTS

| 5,664,653 A * | 9/1997 | Kurita ............ F16D 41/07 188/82.1 |
| 2015/0252844 A1* | 9/2015 | Vance ............ F16C 41/001 384/322 |

FOREIGN PATENT DOCUMENTS

| DE | 9014391 U1 * | 1/1991 | ............ F16D 41/07 |
| DE | 9014391 U1 | 1/1991 | |

(Continued)

*Primary Examiner* — Huan Le
(74) *Attorney, Agent, or Firm* — Hayes Soloway PC

(57) ABSTRACT

A clamping body freewheel unit and a drive device for motor-assisted driving of an electric bicycle having a clamping body freewheel unit. The clamping body freewheel unit includes a plurality of clamping bodies by which force transmission between an inner shaft and an outer shaft, coupled together via the clamping body freewheel unit, is allowed only in one of two opposite directions of rotation, a cage by which the plurality of clamping bodies of the clamping body freewheel unit are kept together at a defined spacing in a circumferential direction, and a plurality of rolling elements by which the inner and outer shafts are mounted rotatable relative to one another when the inner and outer shafts are coupled together via the clamping body freewheel unit, wherein at least some of the plurality of rolling elements and the clamping bodies are held jointly on the cage.

15 Claims, 3 Drawing Sheets

(56) References Cited

FOREIGN PATENT DOCUMENTS

| JP | 2006322597 A | * | 11/2006 | ............. | F16D 41/07 |
| WO | WO-2015044695 A1 | * | 4/2015 | ............ | B62M 11/02 |

* cited by examiner

CLAMPING BODY FREEWHEELING UNIT AND DRIVE DEVICE FOR AN ELECTRIC BICYCLE HAVING A CLAMPING BODY FREEWHEEL UNIT

CROSS-REFERENCE TO RELATED APPLICATIONS AND PRIORITY

This patent application claims priority from PCT Application No. PCT/DE2020/101019 filed Dec. 2, 2020, which claims priority from German Patent Application No. 10 2019 218 785.4 filed Dec. 3, 2019. Each of these patent applications are herein incorporated by reference in their entirety.

TECHNICAL FIELD

The proposed solution relates to a clamping body freewheel unit having a plurality of clamping bodies, a cage, via which the plurality of clamping bodies are retained at a defined spacing relative to each other in a circumferential direction and a plurality of rolling bodies for rotatably supporting two shafts which are coupled to each other via the clamping body freewheel unit.

BACKGROUND OF THE INVENTION

Clamping body freewheel units are largely known. A plurality of clamping bodies are used in this case to transmit forces only in one of two rotation directions which are opposite each other between inner and outer components, in particular inner or outer shafts, which can be coupled to each other via the clamping body freewheel unit. In this manner, a transmission of forces can be carried out during rotation in one rotation direction while, via the clamping body freewheel unit, a rotation of the components relative to each other is enabled in the opposite rotation direction. In this case, the clamping bodies are retained at defined spacings relative to each other in a cage of the clamping body freewheel unit in one circumferential direction about a rotation axis which is defined by the clamping body freewheel unit and, in this case, can be tilted about a tilting axis which extends perpendicularly to the circumferential direction so that, depending on the rotation direction, a torque is transmitted or not in a non-positive-locking manner via the clamping bodies.

It is known to also provide, for rotatable support precisely with relatively large torques in addition to the plurality of clamping bodies of a clamping body freewheel unit, rolling bodies via which components which are intended to be coupled to each other are rotatably supported relative to each other. For example, the rolling bodies are located between an internal ring of the clamping body freewheel unit and an external ring of the clamping body freewheel unit in front of or directly at the components which are intended to be coupled to each other. For example, an internal ring may be able to be connected to an internal shaft while an external ring can be connected to an external shaft. If the rolling bodies are integrated in the clamping body freewheel unit, typically a separate cage is provided therefor in order to retain the rotatable rolling bodies at a defined spacing relative to each other. Alternatively, a cage is recessed for the rolling bodies, particularly if the rolling bodies are in needle-like form.

SUMMARY OF THE INVENTION

With particular regard to using a clamping body freewheel action in an electric bicycle and the tolerances which have to be provided in this case between two components which are intended to be coupled to each other, such as an internal shaft and an external shaft, and the tight structural spatial conditions, there continues to be a need for improved clamping body freewheel actions.

Against this background, a clamping body freewheel unit of claim 1 is proposed, wherein the at least one portion of a plurality of rolling bodies of the clamping body freewheel unit and the clamping bodies of the clamping body freewheel unit are retained together in one cage.

Consequently, the proposed solution is based on the basic notion of providing a common cage both for clamping bodies and for additional rolling bodies. In the one common cage, consequently, there are formed different types of cage receiving members, on the one hand, for the clamping bodies and, on the other hand, for the rolling bodies. A proposed clamping body freewheel unit consequently comprises in addition to clamping bodies a plurality of rolling bodies which are suitable for rotatably supporting an internal shaft and an external shaft relative to each other if these internal and external shafts are coupled to each other via the clamping body freewheel unit. In this case, the additional rolling bodies are rotatably retained in the cage for the clamping bodies.

Via the proposed integration of rolling bodies and clamping bodies in a common cage, smaller construction types of a clamping body freewheel unit are possible. It is also possible to substantially reduce the costs for the clamping bodies because, in practice, a greater tolerance range is acceptable and additional safeguards in setting tolerances no longer have to be provided. The assembly can also be simplified. It has further been found that, as a result of the proposed clamping body freewheel unit, the robustness with respect to a maximum torque can be increased and a drag torque during freewheeling action can be reduced.

In this case, the proposed clamping body freewheel unit can have, for coupling an internal shaft and an external shaft, an internal ring and/or an external ring, against which the clamping bodies and the rolling bodies adjoin externally or internally, respectively. However, this is not absolutely necessary. In particular, the clamping body freewheel unit can be constructed without an internal ring and/or without an external ring so that a shaft is directly in contact with the clamping bodies and/or rolling bodies.

In particular, one variant of a proposed clamping body freewheel unit may be configured and provided for use in a motorized drive apparatus for an electric bicycle (consequently, for an eBike or Pedelec). Via the clamping body freewheel unit, for example, a force can then be transmitted in the case of a (motor-driven) rotation of a first, external or internal shaft in a first rotation direction to a different second, internal or external shaft in order to drive the other, second shaft. At the same time, the other, second drivable shaft can also be rotated in the first rotation direction via the clamping body freewheel unit so that, in this case, the first driving shaft can be overtaken. Furthermore, the second drivable shaft can also be rotated via the clamping body freewheel unit without rotating the first driving shaft. In this manner, the clamping body freewheel unit may be in particular configured and provided to uncouple in an electric bicycle at least one drive motor of the motorized drive apparatus from an output shaft so that a torque which is applied at the output shaft by a driver of the electric bicycle cannot be transmitted to the drive motor and a force flow is interrupted in the direction of the drive motor by means of the clamping body freewheel unit. In this manner, in an electric bicycle a motorized drive apparatus can be uncoupled from pedal driving, which is actuated by muscle power, of the electric bicycle via the clamping body freewheel unit so that a driver of the electric bicycle can drive the electric bicycle in a manner actuated by muscle power without any counter-acting resistance as a result of the at least one drive motor and/or a gear mechanism of the motorized drive apparatus when the electromotive drive apparatus is inactive (that is to say, without any motor support).

In one variant, a plurality of rolling bodies of the clamping body freewheel unit are arranged in a first bearing row which extends in the circumferential direction and which extends parallel with a second bearing row of the clamping body freewheel unit with a plurality of clamping bodies (which are retained in one and the same cage). The first and second bearing rows are consequently arranged in a manner axially offset relative to each other with respect to a rotation axis which is defined by the clamping body freewheel unit.

In one variant, a plurality of rolling bodies are arranged together with a plurality of clamping bodies in a bearing row which extends in the circumferential direction of the clamping body freewheel unit. In the circumferential direction, consequently, a plurality of rolling bodies and a plurality of clamping bodies follow each other within this bearing row. Such a variant particularly includes in this case the fact that, in addition to such a (mixed) bearing row with rolling bodies and clamping bodies, an additional bearing row can also be provided in the clamping body freewheel unit, wherein this additional bearing row can contain a mixture of rolling bodies and clamping bodies, only rolling bodies or only clamping bodies.

In one variant, at least two clamping bodies directly follow each other in the circumferential direction in the bearing row with a plurality of rolling bodies and a plurality of clamping bodies before at least one rolling body follows one of the at least two clamping bodies in the circumferential direction. In a variant based on this, typically more clamping bodies than rolling bodies are then provided in the bearing row in order to be able to transmit a greater torque for the force transmission via the clamping bodies.

In one variant, the clamping body freewheel unit comprises at least two bearing rows which each have a plurality of clamping bodies and which are located beside each other along a rotation axis which is defined by the clamping body freewheel unit. For example, the clamping body freewheel unit may comprise three bearing rows which are located beside each other along the rotation axis. In this instance, two bearing rows can each have a plurality of clamping bodies (exclusively clamping bodies or a mixture with a plurality of rolling bodies) while one bearing row has exclusively a plurality of rolling bodies. In a corresponding variant of a three-row clamping body freewheel unit, consequently, there is provided at least one bearing row which comprises exclusively rolling bodies, the rolling bodies of which are, however, rotatably retained in one and the same cage as the clamping bodies of one of or all of the other bearing rows.

In one variant of a three-row clamping body freewheel unit, the cage forms, between one of the bearing rows with a plurality of clamping bodies and the bearing row having exclusively a plurality of rolling bodies, a web which extends radially outwardly with respect to the rotation axis. The different bearing rows are then not only functionally but also structurally separated from each other at the clamping body freewheel unit by means of this web which extends radially outwardly.

In two bearing rows which each have clamping bodies, in principle clamping bodies which are not connected over the bearing rows may be provided.

In an alternative variant, the clamping bodies of two adjacent bearing rows are connected to each other, particularly constructed integrally with each other and thereby form a single clamping body row. For example, the clamping bodies of a clamping body row have a common base at a radially internal side and are separated from each other locally by a slot which extends about the rotation axis at a radially external side. As a result of the slot which extends over the circumference, consequently, a clamping body row is formed with two bearing rows, in which there is provided one row of clamping bodies which are located one behind the other in the circumferential direction and which can each transmit forces to the internal shaft via a common base.

Consequently, the proposed solution includes in particular variants of a clamping body freewheel unit in which in a cage, in addition to a row containing only rolling bodies (rolling body row), at least one row of clamping bodies which follow each other in a circumferential direction, for example, slotted or non-slotted clamping bodies (clamping body row), is further provided. Furthermore, variants are included in which, by arranging two rolling bodies which are located one behind the other in an axial direction in gaps between clamping bodies, which follow each other in a circumferential direction, of a clamping body row, two bearing rows which each have rolling bodies and clamping bodies are formed and provided in a cage.

For the additional functional integration, in one variant at least one seal is provided in the cage. This seal is then, for example, injection-molded on the cage.

For example, the seal is provided at an axial front side of the cage with respect to a rotation axis defined by the clamping body freewheel unit. The seal which is integrated therein at a front side of the cage and which is particularly injection-molded thereon then allows sealing, for example, at a drive apparatus for an electric bicycle, with respect to the environment when the clamping body freewheel unit is fitted.

For example, the seal which is provided on the cage and which is particularly injection-molded thereon forms at least one sealing lip.

In one variant, at least some of the rolling bodies are in the form of cylinder rollers.

The proposed solution further relates to a drive apparatus for an electric bicycle having at least one proposed clamping body freewheel unit. The drive apparatus is consequently configured and provided, for example, for a motorized driving of an electric bicycle and has at least one variant of a proposed clamping body freewheel unit for providing a clamping body freewheel action.

In one variant, the drive apparatus comprises at least one drive motor and gear mechanism in order to transmit a drive torque which is produced by the at least one drive motor to an output shaft (via the gear mechanism). The output shaft may be, for example, a bottom bracket shaft for the electric bicycle. The at least one drive motor and the gear mechanism and/or the gear mechanism and the output shaft can then be uncoupled from each other via the clamping body freewheel unit. In this manner, consequently, a force flow in the direction of the drive motor is interrupted via the clamping body freewheel unit so that the motorized drive apparatus and in particular the at least one drive motor thereof do not have to be "dragged along" during driving actuated by muscle power.

The proposed solution further comprises an electric bicycle having at least one proposed clamping body freewheel unit and/or one proposed drive apparatus.

The appended Figures illustrate variants of the proposed solution which are possible by way of example.

DETAILED DESCRIPTION OF DRAWINGS

Figure 1:
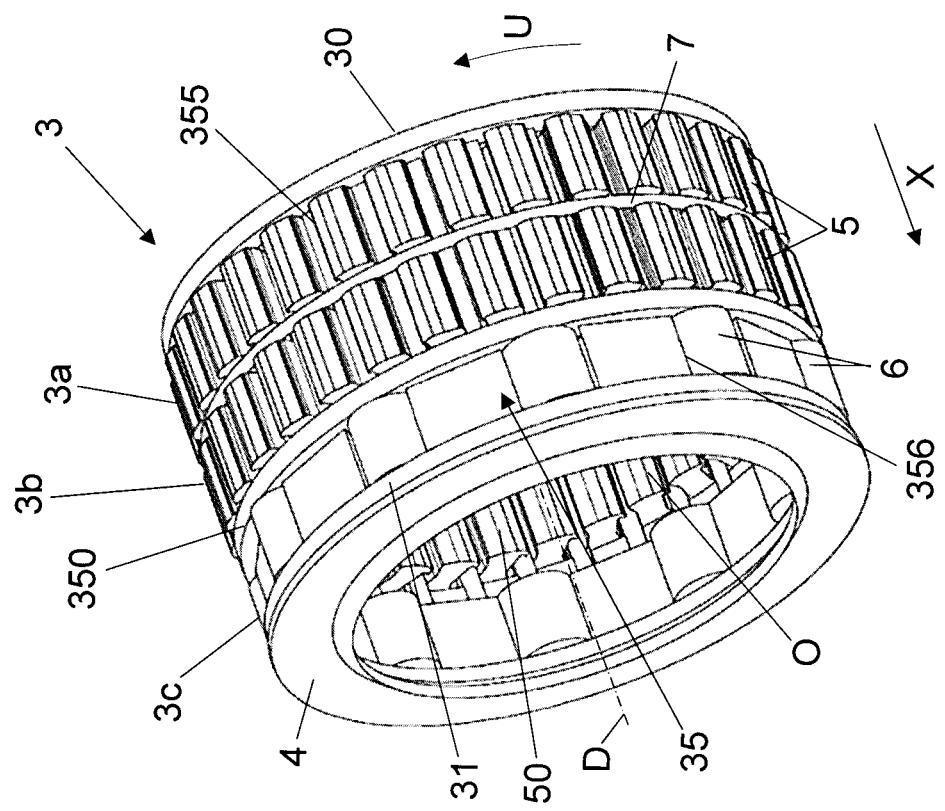
FIG. 1 shows a perspective view of a first variant of a proposed clamping body freewheel unit having three bearing rows, the clamping bodies and rolling bodies of which are retained in a single common cage of the clamping body freewheel unit.

FIG. 1 shows a perspective view of a first variant of a proposed clamping body freewheel unit 3. The clamping body freewheel unit 3 of FIG. 1 has three rows, that is to say, it is constructed with three bearing rows 3a, 3b and 3c. These three bearing rows 3a, 3b and 3c are present beside each other along a rotation axis D which is defined by the clamping body freewheel unit 3 and an axis direction X which extends parallel therewith.

The first two bearing rows 3a and 3b which follow each other from a first axial front side 30 in the axis direction X each have exclusively clamping bodies 5. These clamping bodies 5 are retained beside each other in a circumferential direction U about the rotation axis D with defined spacing relative to each other and supported so as to be able to tilt about a tilting axis which is parallel with the rotation axis D. In this manner, depending on the rotation direction of an internal shaft and an external shaft which are coupled to each other via the clamping body freewheel unit 3 and a tilting position which depends thereon, the clamping bodies 5 can transmit a torque between the internal shaft and the external shaft or allow a rotation of the internal shaft and the external shaft relative to each other. For connection to an internal shaft, the clamping body freewheel unit 3 has a central bearing opening O, in which the internal shaft can engage, in particular can be pressed. An external shaft can in turn be connected to the clamping body freewheel unit 3 radially externally by, for example, the clamping body freewheel unit 3 being inserted in a hollow end portion of the external shaft or, vice versa, the (hollow) shaft which is hollow at least at one end thereof being fitted onto the clamping body freewheel unit 3, in particular pressed on.

The two bearing rows 3a and 3b of the clamping body freewheel unit 3 of FIG. 1 which have the clamping bodies 5 are supplemented by a third bearing row 3c which has exclusively rolling bodies in the form of cylinder rollers 6. Via the cylinder rollers 6, the internal and external shafts can (additionally) be rotatably supported relative to each other if the internal and external shafts are coupled to each other via the clamping body freewheel unit 3. The cylinder rollers 6 are in this instance retained with a defined spacing relative to each other in the circumferential direction U in cage receiving members 356 which are formed by one and the same cage 35 which also forms cage receiving members 355 for the clamping bodies 5 of the other two bearing rows 3a and 3b. The cage 35 of the clamping body freewheel unit 3 of FIG. 1 consequently integrates cage receiving members 355 and 356 both for the clamping bodies 5 and for the cylinder rollers 6.

In order to spatially separate the cylinder rollers 6 of the bearing row 3c from an adjacent bearing row 3b with clamping bodies 5, the cage 35 forms a radially outwardly projecting web 350 which extends annularly.

In principle, the clamping bodies 5 of the first two bearing rows 3a and 3b can be configured completely separately from each other. In the variant of FIG. 1 illustrated, the clamping bodies 5 of the first two adjacent bearing rows 3a and 3b are integrally constructed with each other in contrast. In structural terms, the clamping body freewheel unit 3 of FIG. 1 consequently has a single rolling body row 3c and a single clamping body row 3a, 3b which is located axially adjacent thereto.

Thus, the clamping bodies 5 have a common base 50 at a radially inwardly located side and are separated from each other locally by a slot which extends about the rotation axis D at a radially externally located side. An annular spring 7 for abutment against the external shaft is arranged in this slot which extends circumferentially and therefore between the two bearing rows 3a, 3b. As a result of the slot which extends over the circumference, the two bearing rows 3a, 3b which are ultimately part of precisely one row of clamping bodies 5, which are located one behind the other in a circumferential direction, of a clamping body row 3a, 3b are formed. In this manner, an axial spacing which is defined by the slot is predetermined between portions of a radially external covering face of the clamping bodies 5, which portions each adjoin an external shaft. At the same time, the clamping bodies 5 of both bearing rows 3a, 3b transmit forces to the internal shaft via the common base 50.

The three bearing rows 3a, 3b and 3c are located between two axial front sides 30 and 31 of the cage 35. At one of these front sides 30, 31—in FIG. 1, the front side 31 shown on the left—an annular seal 4 with a sealing lip is injection-molded on. In this manner, an axial and/or radial seal can also be provided when the clamping body freewheel unit 3 is fitted.

Figure 2:
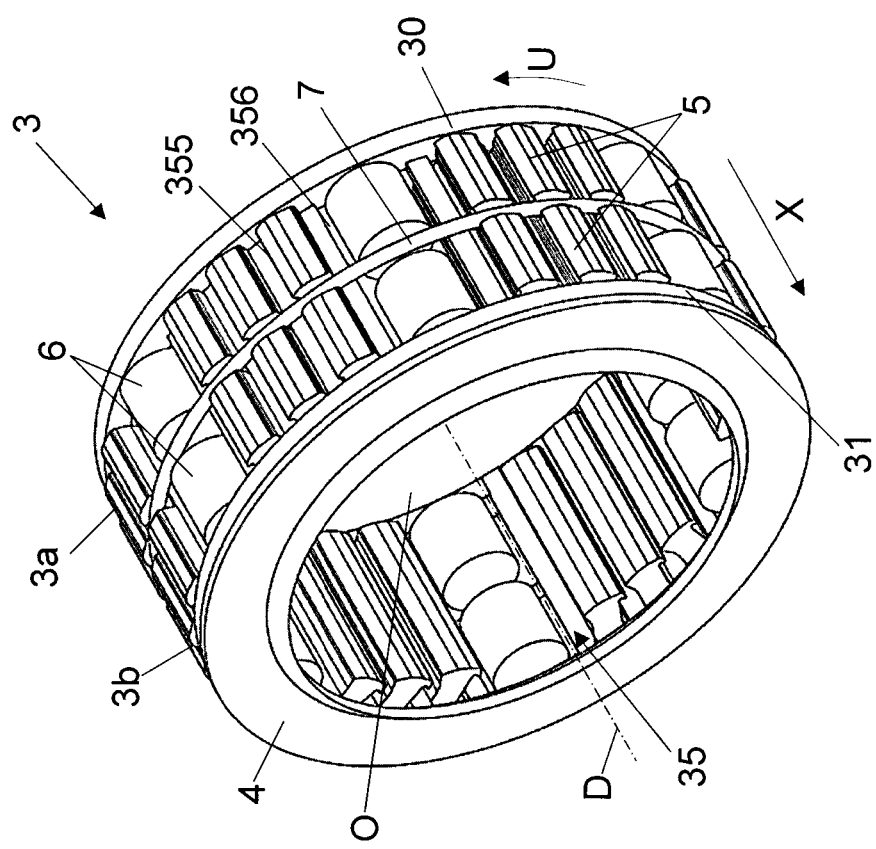
FIG. 2 shows a perspective view of another variant of the proposed clamping body freewheel unit having two mixed bearing rows which are located axially beside each other and which each have clamping bodies and rolling bodies in a common cage.

In the additional variant of FIG. 2, a clamping body freewheel unit 3 provides for a mixture of bearing rows 3a and 3b within a single clamping body row. An annular spring 7 is also provided here between the bearing rows 3a and 3b. Furthermore, the clamping bodies 5 and the cylinder rollers 6 are retained in a common cage 35 of the clamping body freewheel unit 3. A seal 4 is also injection-molded on this cage 35 at a front side 31.

Unlike the clamping body freewheel unit of FIG. 1, the clamping body freewheel unit 3 of FIG. 2 is constructed with two rows and with a mixture of bearing rows 3a and 3b, wherein both clamping bodies 5 and cylinder rollers 6 are provided in the circumferential direction U about the rotation axis D. In each bearing row 3a, 3b, consequently, cylinder rollers 6 are arranged in the cage 35 in addition to the clamping rollers 5. Consequently, the cage 35 forms for each bearing row 3a and 3b not only cage receiving members 355 for clamping bodies 5 but also cage receiving members 356 for cylinder rollers 6. In the variant of FIG. 2, precisely one cylinder roller 6 repeatedly follows a plurality of clamping bodies 5 (in this case, three) in each bearing row 3a, 3b in this case.

Both in the variant of FIG. 1 and in the variant of FIG. 2, there may be provision for the clamping bodies 5 to bridge two bearing rows 3a and 3b internally while externally they are separated by a gap, in which the annular spring 7 is inserted.

Figure 3:
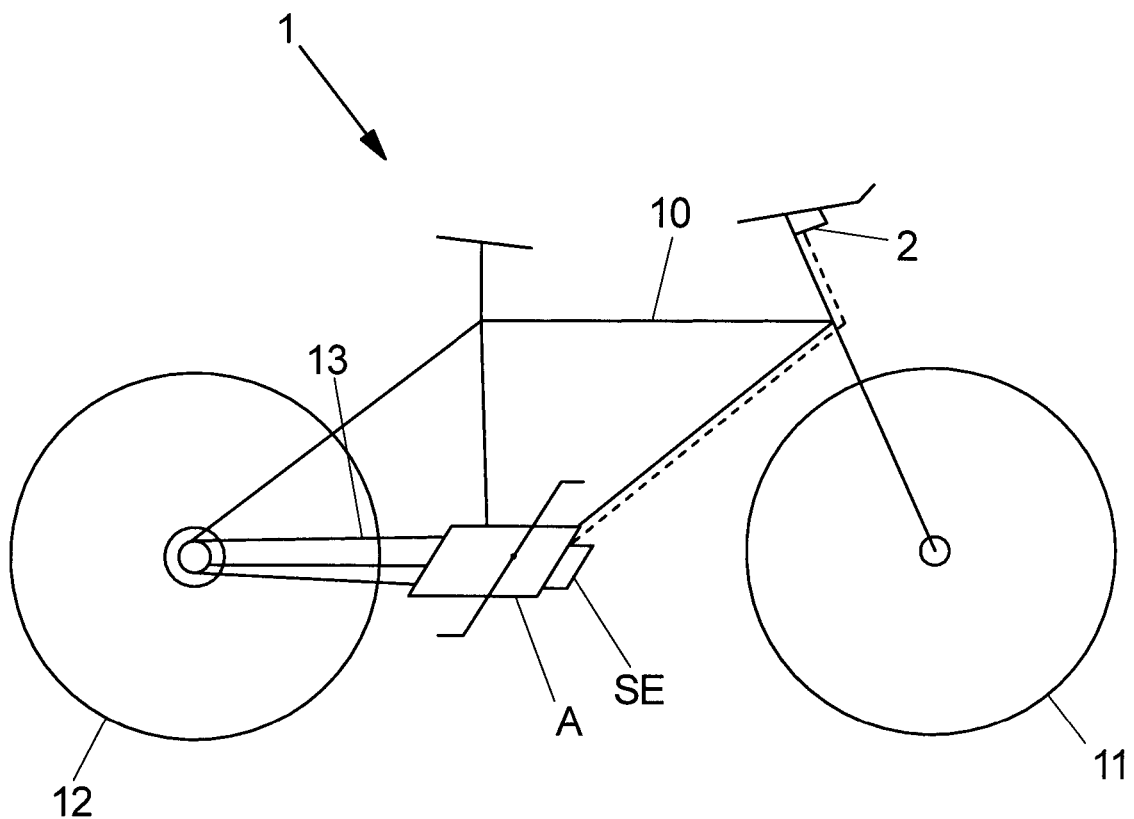
FIG. 3 schematically shows a variant of an electric bicycle, in which variants of the proposed solution are used.

The clamping body freewheel units 3 of FIGS. 1 and 2 are, for example, provided for use in an electromotive drive apparatus A of an electric bicycle 1 according to FIG. 3. This electromotive drive apparatus A allows—in a manner controlled by a drive-side electronic control unit SE and an operating unit 2 which is arranged, for example, on a handlebar of the electric bicycle—electromotive support of the electric bicycle 1. In this instance, a front wheel 11 and a rear wheel 12 are rotatably supported on a frame 10 of the electric bicycle 1 (in the front region on a fork which is articulated thereto), wherein the rear wheel 12 can be driven via a force transmission member, for example, in the form of a chain or a belt 13 via the electromotive drive apparatus A.

A drive torque is transmitted towards an output shaft which is connected to the chain or the belt 13 via at least one electric motor of the drive apparatus A—typically in conjunction with a gear mechanism of the drive apparatus A. The output shaft, which may be in particular the bottom bracket shaft of the electric bicycle 1, forms in this instance an internal or an external shaft in a clamping body freewheel unit 3 which is coupled to a driving shaft of the electromotive drive apparatus A via the clamping body freewheel unit 3. In this instance, the clamping body freewheel unit 3 enables the electromotive drive apparatus A not to act counter, in the event of inactivity, a torque which is generated at the output shaft as a result of actuation by muscle power, but at the same time a torque which is generated by motor to be able to be transmitted to the rear wheel 12. In this case, a robust and compact construction type for the integration of a corresponding clamping body freewheel action is enabled via the arrangement of the cylinder rollers 6 axially beside the clamping bodies 5 (as in the variant of FIG. 1) or between the clamping bodies 5 (as in the variant of FIG. 2) in a common cage 35.

The invention claimed is:

1. A clamping body freewheel unit having:
   a plurality of clamping bodies, by which a force transmission between an internal shaft and an external shaft which can be coupled to each other via the clamping body freewheel unit, is enabled in only one of two mutually opposing rotation directions,
   a cage, by which the plurality of clamping bodies of the clamping body freewheel unit are retained at a defined spacing relative to each other in a circumferential direction
   a plurality of rolling bodies, by which the internal shaft and external shaft are supported so as to be rotatable relative to each other if the internal shaft and external shaft are coupled to each other via the clamping body freewheel unit, and
   three bearing rows which are located beside each other along a rotation axis which is defined by the clamping body freewheel unit for the internal shaft and external shaft, wherein two of the three bearing rows each have clamping bodies from the plurality of clamping bodies and one of the three bearing rows has exclusively rolling bodies from the plurality of rolling bodies, wherein
   at least some of the plurality of rolling bodies and the clamping bodies are retained together in the cage.

2. The clamping body freewheel unit of claim 1, wherein the plurality of rolling bodies are arranged in a first bearing row of the three bearing rows of the clamping body freewheel unit, which row extends in the circumferential direction and extends parallel with a second bearing row of the three bearing rows of the clamping body freewheel unit with a plurality of clamping bodies.

3. The clamping body freewheel unit of claim 1, wherein the plurality of rolling bodies are arranged together with the plurality of clamping bodies in a bearing row of the three bearing rows which extends in the circumferential direction of the clamping body freewheel unit.

4. The clamping body freewheel unit of claim 3, wherein at least two clamping bodies from the plurality of clamping bodies follow each other in the circumferential direction in the bearing row with the plurality of rolling bodies and the plurality of clamping bodies before at least one rolling body from the plurality of rolling bodies follows one of the at least two clamping bodies in the circumferential direction.

5. The clamping body freewheel unit of claim 1, wherein the clamping body freewheel unit comprises at least two bearing rows of the three bearing rows which each have clamping bodies from the plurality of clamping bodies and which extend parallel with each other.

6. The clamping body freewheel unit of claim 1, wherein the clamping body freewheel unit comprises at least two bearing rows of the three bearing rows which each have clamping bodies from the plurality of clamping bodies and which are located beside each other along the rotation axis which is defined by the clamping body freewheel unit for the internal shaft and external shaft.

7. The clamping body freewheel unit of claim 1, wherein, between one of the bearing rows with clamping bodies from the plurality of clamping bodies and the bearing row having exclusively rolling bodies from the plurality of rolling bodies, a web which extends radially outwardly with respect to the rotation axis is formed on the cage.

8. The clamping body freewheel unit of claim 1, wherein the clamping bodies of two adjacent bearing rows of the three bearing rows are connected to each other, particularly constructed integrally with each other, and are separated from each other locally by a slot which extends about the rotation axis at a radially external side.

9. The clamping body freewheel unit as claimed in claim 1, wherein one or more bearing rows of the three bearing rows of the clamping body freewheel unit are formed by a clamping body row which has clamping bodies from the plurality of clamping bodies which follow each other in a circumferential direction and which are each slotted at a radially external side.

10. The clamping body freewheel unit as claimed in claim 1, wherein at least one seal is provided on the cage, in particular injection-molded thereon.

11. The clamping body freewheel unit of claim 10, wherein the seal is provided at an axial front side of the cage with respect to the rotation axis defined by the clamping body freewheel unit.

12. The clamping body freewheel unit as claimed in claim 1, wherein at least some of the rolling bodies are in the form of cylinder rollers.

13. A drive apparatus for an electric bicycle having the at least one clamping body freewheel unit as claimed in claim 1.

14. The drive apparatus of claim 13, wherein the drive apparatus comprises at least one drive motor and gear mechanism in order to transmit a drive torque which is produced by the at least one drive motor to an output shaft and wherein at least one of:
   the at least one drive motor and the gear mechanism; and
   the gear mechanism and the output shaft, can be uncoupled from each other via the clamping body freewheel unit.

15. An electric bicycle having the at least one clamping body freewheel unit as claimed in claim 1 and having a drive apparatus for the electric bicycle.

\* \* \* \* \*